United States Patent
Seok et al.

(10) Patent No.: US 11,272,536 B2
(45) Date of Patent: Mar. 8, 2022

(54) MULTI-LINK OPERATION SETUP AND CHANNEL ACCESS CONTROL

(71) Applicant: MediaTek Singapore Pte. Ltd., Solaris (SG)

(72) Inventors: Yongho Seok, San Jose, CA (US); Jianhan Liu, San Jose, CA (US); Gabor Bajko, San Jose, CA (US); James Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 59 days.

(21) Appl. No.: 16/533,636

(22) Filed: Aug. 6, 2019

(65) Prior Publication Data
US 2020/0053773 A1    Feb. 13, 2020

Related U.S. Application Data

(60) Provisional application No. 62/715,824, filed on Aug. 8, 2018, provisional application No. 62/764,885, filed on Aug. 16, 2018.

(51) Int. Cl.
*H04W 74/08* (2009.01)
*H04W 88/06* (2009.01)

(52) U.S. Cl.
CPC ............ *H04W 74/08* (2013.01); *H04W 88/06* (2013.01)

(58) Field of Classification Search
CPC ..... H04W 74/08; H04W 84/12; H04W 88/06; H04W 8/22
See application file for complete search history.

(56) References Cited

U.S. PATENT DOCUMENTS

| | | | | |
|---|---|---|---|---|
| 9,468,015 | B2* | 10/2016 | Cheng | H04L 5/006 |
| 2003/0058952 | A1* | 3/2003 | Webster | H04L 25/0226 375/260 |
| 2004/0073674 | A1* | 4/2004 | Vergnaud | H04L 29/06 709/226 |
| 2012/0300759 | A1 | 11/2012 | Patanapongpibul et al. | |
| 2013/0266136 | A1 | 10/2013 | Chu et al. | |
| 2014/0010186 | A1* | 1/2014 | Cordeiro | H04W 28/16 370/329 |

(Continued)

FOREIGN PATENT DOCUMENTS

WO    2018136521 A1    7/2018

OTHER PUBLICATIONS

Mohamed Abouelseoud et al., Multi-band Discovery Assistance, Mar. 8, 2018, pp. 1-19, doc.:11-18/0486r1, XP068125492.

(Continued)

*Primary Examiner* — Kashif Siddiqui

(57) ABSTRACT

Embodiments of the present invention provide a method and apparatus for simultaneous transmission and reception of data wirelessly using different wireless bands. The multi-link operations described herein can provide higher network throughput and improved network flexibility compared to traditional techniques to wireless communication. Embodiments of the present invention support joint or independent transmission of data over different links, and a full duplex connection can be enabled by independent multi-band operation e.g., a frequency division duplex mode.

20 Claims, 10 Drawing Sheets

(56) References Cited

U.S. PATENT DOCUMENTS

| | | | |
|---|---|---|---|
| 2016/0044711 A1* | 2/2016 | Lou | H04B 7/0617 |
| | | | 370/338 |
| 2016/0337230 A1* | 11/2016 | Emmanuel | H04W 28/0263 |
| 2017/0280460 A1* | 9/2017 | Emmanuel | H04L 5/0062 |
| 2018/0084538 A1* | 3/2018 | Jupudi | H04B 7/0452 |
| 2018/0092039 A1 | 3/2018 | Cariou et al. | |
| 2018/0206174 A1 | 7/2018 | Zhou et al. | |
| 2019/0014469 A1* | 1/2019 | Dees | H04L 63/162 |

OTHER PUBLICATIONS

Carlos Cordeiro, D1.0 comment resolution, IEEE P802.11 Wireless LANs, Feb. 3, 2011, doc.:IEEE 802.11-11/0212r1, XP068035682.

Mohamed Abouelseoud et al., Multi-band Discovery Assistance for 802.11ay (CR on CID 1771), Jul. 9, 2018, pp. 1-10, doc.:IEEE 802.11-18/1202r2, XP068128312.

Jianhan Liu et al, Multi-AP Enhancement and Multi-Band Operations, Jun. 7, 2018, doc.: IEEE 802.11-18/1155r1, XP068128210.

Mohamed Abouelseoud, Multi-band discovery assistance normative text, IEEE P802.11 Wireless LANs, Mar. 6, 2018, pp. 1-21, doc. :IEEE 802.11-18/491r0, XP068125499.

Mohamed Abouelseoud et al., "Multi-band Discovery Assistance," IEEE 802.11 Mar. 2018 plenary meeting in Rosemont, Illinois, United States, Mar. 8, 2018.

* cited by examiner

MULTI-LINK OPERATION SETUP AND CHANNEL ACCESS CONTROL

CROSS-REFERENCE TO RELATED APPLICATIONS

This application claims the benefit of and priority to provisional patent application Ser. No. 62/715,824, with filing date Aug. 8, 2018, and provisional patent application Ser. No. 62/764,885, with filing date Aug. 16, 2018. These applications are hereby incorporated by reference in their entirety.

FIELD

Embodiments of the present invention generally relate to the field of wireless communications. More specifically, embodiments of the present invention relate to systems and methods for efficiently managing channel access for multi-band communication.

BACKGROUND

Modern electronic devices typically send and receive data with other electronic devices wirelessly using Wi-Fi, and many of these devices are "dual band" devices that include at least two wireless transceivers capable of operating in different bands e.g., 2.4 GHz and 5 GHz. In most cases, a device will communicate over only a single band at a time. For example, older and low-power devices e.g., battery powered devices, often operate on the 2.4 GHz band. Newer device and devices that require greater bandwidth often operate on the 5 GHz band.

However, in some cases, the use of a single band may not satisfy the bandwidth needs of certain devices. Therefore, what is needed is a technique for wireless communication that can increase bandwidth by operating on multiple bands concurrently, and can control which device or devices can use the multiple bands, for example, based on current network traffic.

SUMMARY

Accordingly, embodiments of the present invention provide a method and apparatus for simultaneous transmission and reception of data wirelessly using different wireless bands. The multi-link operations described herein can provide higher network throughput and improved network flexibility compared to traditional techniques to wireless communication. Embodiments of the present invention support joint or independent transmission of data over different links, and a full duplex connection can be enabled by independent multi-band operation e.g., a frequency division duplex (FDD) mode.

According to one embodiment, a method of establishing cooperative multi-band operation between a wireless station (STA) and a wireless access point (AP) is disclosed. The method includes a) transmitting a first frame from the AP to the STA, where the first frame includes a subfield indicating that the AP supports multi-band operation, b) transmitting a second frame from the AP to the STA, where the second frame includes band information of a first band and a second band that support multi-band operation, c) transmitting a third frame from the STA to the AP, where the third frame includes a request to establish multi-band operation using the first band and the second band, and d) transmitting a fourth frame from the AP to the STA, where the fourth frame includes a confirmation to establish multi-band operation using the first band and the second band.

According to some embodiments, the method includes sending and receiving data between the STA and the AP using cooperative multi-band operation over the first band and the second band.

According to some embodiments, the first band includes a 2.4 GHz wireless band and the second band includes a 5 GHz wireless band.

According to some embodiments, the STA and AP both include a 2.4 GHz wireless transceiver for operating over the first band and a 5 GHz wireless transceiver for operating over the second band.

According to some embodiments, the 2.4 GHz wireless transceivers and the 5 GHz wireless transceivers are operable to communicate simultaneously.

According to some embodiments, the third frame includes a media access control (MAC) address of the STA.

According to some embodiments, the fourth frame includes an operating mode for configuring the cooperative multi-band operation.

According to some embodiments, the method includes sending a fifth frame from the STA to the AP, where the fifth frame includes a modified band, and where the modified band replaces the first band for performing the cooperative multi-band operation.

According to some embodiments, the method includes sending a fifth frame from the AP to the STA, where the fifth frame includes a modified band, and where the modified band replaces the first band for performing the cooperative multi-band operation.

According to some embodiments, the method includes sending a fifth frame from the STA to the AP, where the fifth frame includes a blank band information field and terminating the cooperative multi-band operation.

According to some embodiments, the method includes sending a fifth frame from the AP to the STA, where the fifth frame includes a blank band information field, and terminating the cooperative multi-band operation.

According to another embodiment, a system for cooperative multi-band operation is disclosed. The system includes a wireless station (STA) and a wireless access point (AP). The AP transmits a first frame to the STA, where the first frame includes a subfield indicating that the AP supports multi-band operation, the AP transmits a second frame to the STA, the second frame includes band information of a first band and a second band that support multi-band operation, the STA transmits a third frame to the AP, the third frame includes a request to establish multi-band operation using the first band and the second band, and the AP transmits a fourth frame to the STA, where the fourth frame includes a confirmation to establish multi-band operation using the first band and the second band.

According to a different embodiment, a dual-band device for performing cooperative multi-band operation with a wireless station (STA) is disclosed. The device includes a first transceiver configured to communicate over a first wireless band, a second transceiver configured to communicate over a second wireless band, where the first transceiver and the second transceiver are operable to communicate simultaneously, and a cooperative management unit configured to exchange data with the first transceiver and the second transceiver for managing simultaneous communication of the first transceiver and the second transceiver. The device is operable to transmit a first frame to an STA, where the first frame includes a subfield indicating that the device supports multi-band operation, transmit a second frame to the STA, where the second frame includes band information of a first band and a second band that support multi-band operation, receive a third frame from the STA, where the third frame includes a request to establish multi-band operation using the first band and the second band, and transmits a fourth frame to the STA, where the fourth frame includes a confirmation to establish multi-band operation using the first band and the second band.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
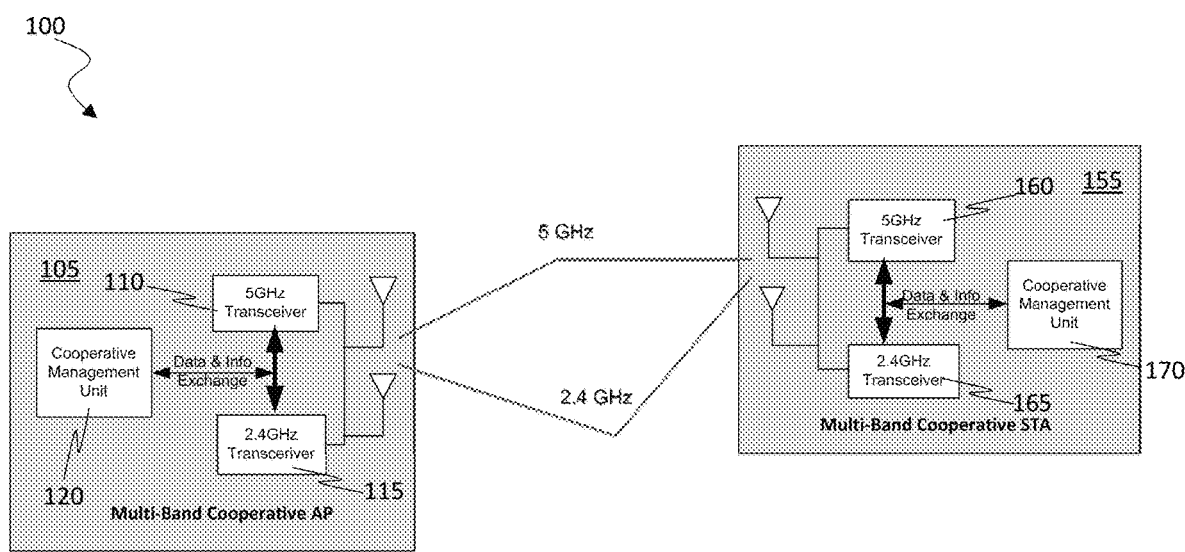
FIG. 1 is a block diagram of an exemplary wireless communication system including a multi-band cooperative AP and a multi-band cooperative STA depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 4, 5A, 5B, 5C, 5D, and 5E) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Multi-Link Operation Setup and Channel Access Control

Embodiments of the present invention provide a method and apparatus for simultaneous transmission and reception of data wirelessly using different wireless bands. The multi-link operations described herein can provide higher network throughput and improved network flexibility compared to traditional techniques to wireless communication. Embodiments of the present invention support joint or independent transmission of data over different links, and a full duplex connection can be enabled by independent multi-band operation e.g., a frequency division duplex (FDD) mode.

As used herein, the term "EHT" may refer to a recent generation of wireless communication (Wi-Fi) known as Extremely High Throughput (EHT) and is defined according to the IEEE 802.11 be standards. The term station (STA) may refer to an electronic device capable of sending and receiving data over Wi-Fi that is not operating as an access point (AP).

With regard to FIG. 1, an exemplary wireless communication system 100 including a multi-band cooperative AP 105 and a multi-band cooperative STA 155 are depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

The multi-band cooperative ST 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively.

The multi-band cooperative AP 105 and the multi-band cooperative STA 155 have simultaneous transmission and reception capability for communicating using different wireless bands. The transmitters operating on the different bands can perform independent clear channel assessments (CCAs) using joint or intendent transmissions. Moreover, full duplex communication can be enabled by independent multi-band operation using FDD mode.

The STA 155 can access channels in multiple bands independently. For example, after receiving an enhanced distributed channel access (EDCA) transmission opportunity (TXOP) frame, the STA 155 can begin transmitting frames over the respective band during the window of time provided in the EDCA TXOP frame. When the STA 155 receives EDCA TXOP frames in multiple bands simultaneously, the STA 155 can transmit frames using multiple bands simultaneously during the provided window of time.

The STA 155 transmitting frames using multiple bands simultaneously can mitigate delay and improve peak throughput of the STA 155. However, in some cases, transmitting frames using multiple bands simultaneously can degrade the performance of the basic service set (BSS) comprising the STA 155. For example, the performance of the BSS can be degraded when the STA 155 operating on multiple bands simultaneously uses a substantial amount of the bandwidth available to the BSS due to the increased traffic. Therefore, according to embodiments of the present invention, the AP 105 can control which STAs are granted multi-band channel access, and the access can be terminated by the AP at any time, for example, based on changing network conditions or requirements.

Figure 2:
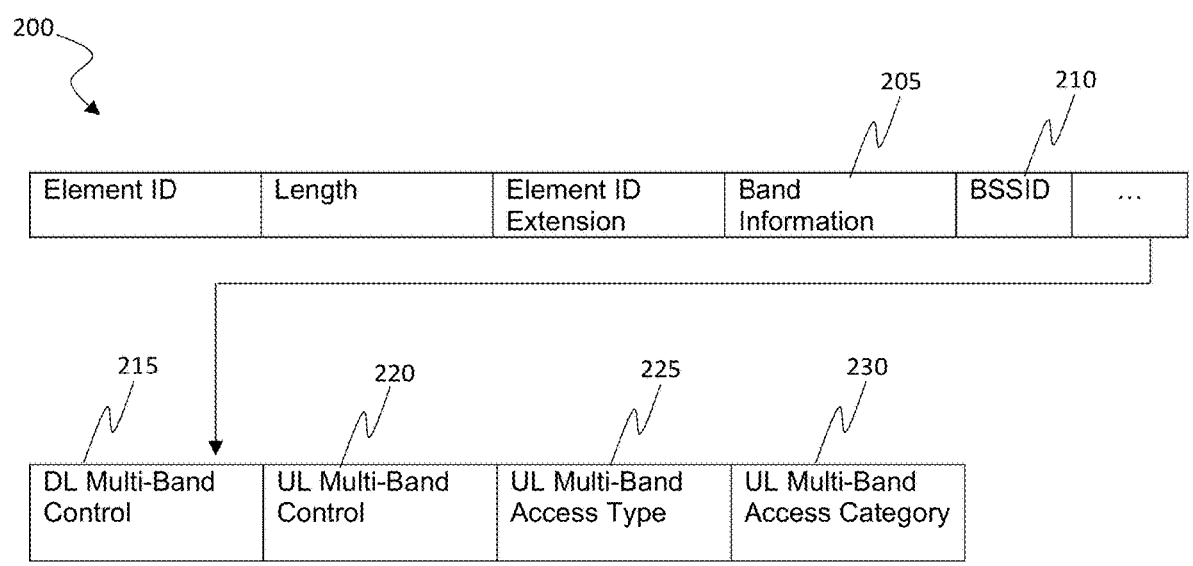
FIG. 2 is a block diagram of an exemplary Multi-Band Operating Mode element for controlling multi-band channel access according to embodiments of the present invention.

FIG. 2 depicts an exemplary multi-band operating mode element 200 configuring and controlling multi-band channel access according to embodiments of the present invention. The multi-band channel access can provide higher network throughput and improved network flexibility compared to typical single-band communication. An AP initially indicates support for cooperative multi-band operation using an Extended Capabilities IE carried in a beacon, probe response, or association/re-association response frame. The Cooperative Multi-band Operating Capable Field in the Extended Capabilities Information Element (IE) indicates that the AP supports cooperative multi-band operation when the value of the field is 1.

The AP then transmits Multi-Band Operating Mode fields in a Multi-Band Operating Mode element 200 for each supported band to the STAs. The Multi-Band Operating Mode element 200 provided to the STAs includes Band Information subfield 205, basic service set identifier (BSSID) subfield 210, Downlink (DL) Multi-Band Control subfield 215, Uplink (UL) Multi-Band Control subfield 220, UL Multi-Band Access Type subfield 225, and UL Multi-Band Access Category subfield 230.

The Band Information subfield 205 indicates a specific band that supports multi-band channel access. The value of the Band Information subfield 205 can be encoded using well-known encoding techniques.

The BSSID subfield 210 indicates the MAC Address of the AP operating in the band indicated by the Band Information subfield 205.

The DL Multi-Band Control subfield 215 is set to 1 when the AP has enabled cooperative multi-band channel access for a downlink frame transmission in the band indicated in the Band Information subfield 205 to enable DL Multi-Band Control. When the AP has not enabled cooperative multi-band channel access for a downlink frame transmission in the band indicated in the Band Information subfield 205, the value is set to 0.

UL Multi-Band Control subfield 220 is set to 1 when the AP has enabled cooperative multi-band channel access for an uplink frame transmission in the band indicated in the Band Information subfield 205. When the AP has not enabled cooperative multi-band channel access for an uplink frame transmission in the band indicated in the Band Information subfield 205, the value is set to 0.

UL Multi-Band Access Type subfield 225 is set to 1 when contention based cooperative multi-band channel access is enabled for an uplink frame transmission in the band indicated by the Band Information subfield 205. The UL Multi-Band Access Type subfield 225 is set to 0 when contention based cooperative multi-band channel access is not enabled for an uplink frame transmission in the band indicated by the Band Information subfield 205. Moreover, when the UL Multi-Band Access Type subfield is set to 0, the STA can transmit an uplink frame through the cooperative multi-band channel access only after receiving a Trigger frame for Triggered Uplink Access. When the UL Multi-Band Control subfield 220 is set to 0, the UL Multi-Band Access Type subfield 225 is reserved.

UL Multi-Band Access Category subfield 230 indicates access categories on which the STA can transmit an uplink frame for using cooperative multi-band channel access after obtaining an EDCA TXOP. For example, when the UL Multi-Band Access Category subfield 230 indicates AC_V0, the STA can access the medium on AC_V0 for sending frames of the traffic categories associated AC_VO using cooperative multi-band channel access. The UL Multi-Band Access Category subfield 230 is reserved when the UL Multi-Band Access Type subfield 225 is set to 0.

Figure 3:
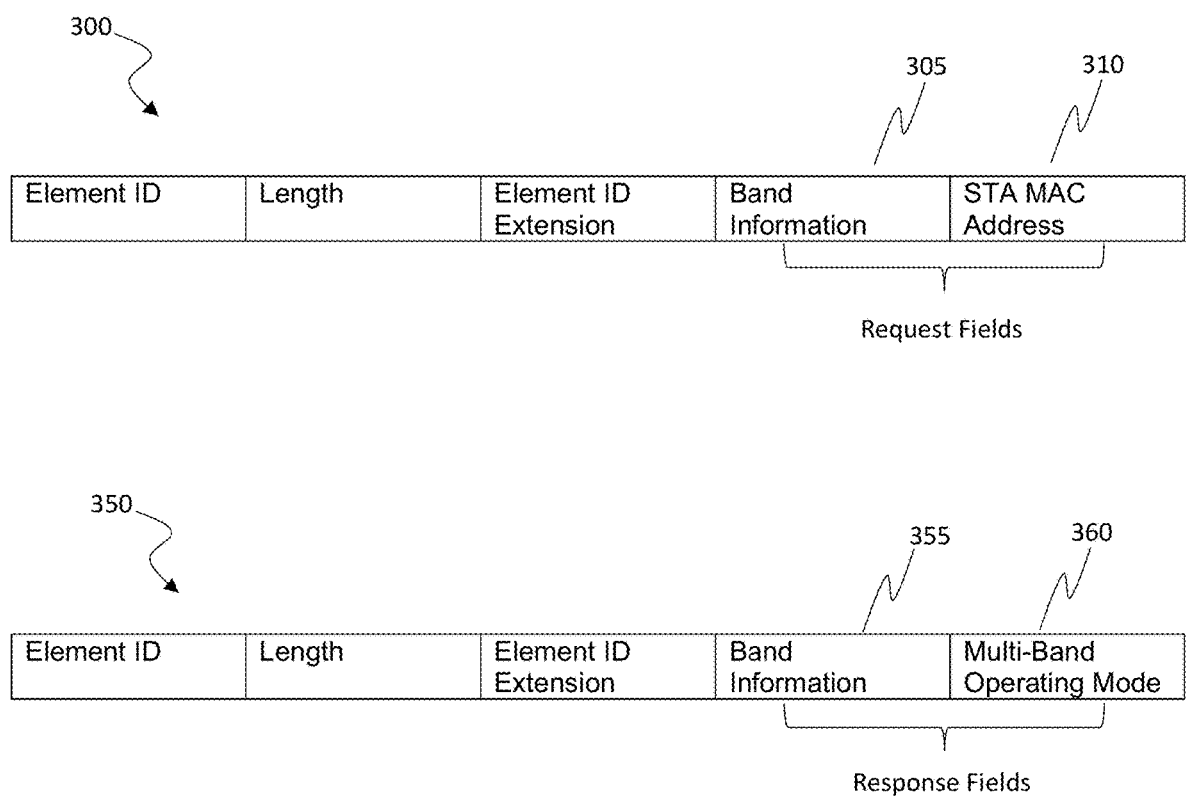
FIG. 3 is a block diagram depicting an exemplary Multi-Band Operating Request element having Multi-band Operating Request fields according to embodiments of the present invention.

FIG. 3 depicts an exemplary Multi-Band Operating request element 300 having Multi-band Operating Request fields and a Multi-Band Operating Response element 350 including Multi-Band Operating Response fields according to embodiments of the present invention. Subsequent to receiving Multi-Band Operating Mode fields 200 (depicted in FIG. 2) from the AP, the STA sends a Multi-Band Operating request element 300 to the AP for each band that the STA request to establish cooperative multi-band operation with the AP. The Multi-band Operating Request fields include a Band Information subfield 305 and an STA MAC Address subfield 310 for each band that the STA wants to use to establish the cooperative multi-band operation.

The Band Information subfield 305 indicates the requested band for cooperative multi-band channel access. The value of the Band Information subfield 305 can be encoded.

The STA MAC Address subfield 310 indicates the MAC Address of the STA operating in the band indicated by the Band Information subfield 305.

After receiving the Multi-Band Operating Request fields in the Multi-Band Operating Request element 300 from the STA, the AP sends a Multi-Band Operating Response element 350 including Multi-Band Operating Response fields to confirm the cooperative multi-band operation setup with the STA. The Multi-Band Operating Response fields include a Confirmed Band Information subfield 355 that indicates a list of confirmed bands for performing cooperative multi-band channel access. The list of confirmed bands are a subset of the bands requested in the Multi-band Operating Request fields of the Multi-Band Operating Request element 300. The value of the Confirmed Band Information subfield can be encoded using well-known encoding techniques. The Multi-Band Operating Response fields can also include a Multi-Band Operating Mode subfield 360 that optionally indicates the operating mode for each confirmed band.

An STA can change the operating parameters of the cooperative multi-band operation after the cooperative multi-band operation has been established by the Multi-Band Operating Request element 300 and the Multi-Band Operating Response element 350 by sending modified Multi-Band Operating Request fields to the AP. The STA then receives new Multi-Band Operating Response fields from the AP in response to the modified Multi-Band Operating Request fields. The AP can change the operating parameters of the cooperative multi-band operation after the cooperative multi-band operation has been established by the Multi-Band Operating Request element 300 and the Multi-Band Operating Response element 350 by sending modified Multi-Band Operating Response fields to the STA.

The cooperative multi-band operation is terminated for a specific confirmed band when the STA receives a Multi-Band Operating Response from the AP having a blank Band Information subfield, or when the STA sends a Multi-Band Operating Request having a blank Confirmed Band Information subfield to the AP.

Figure 4:
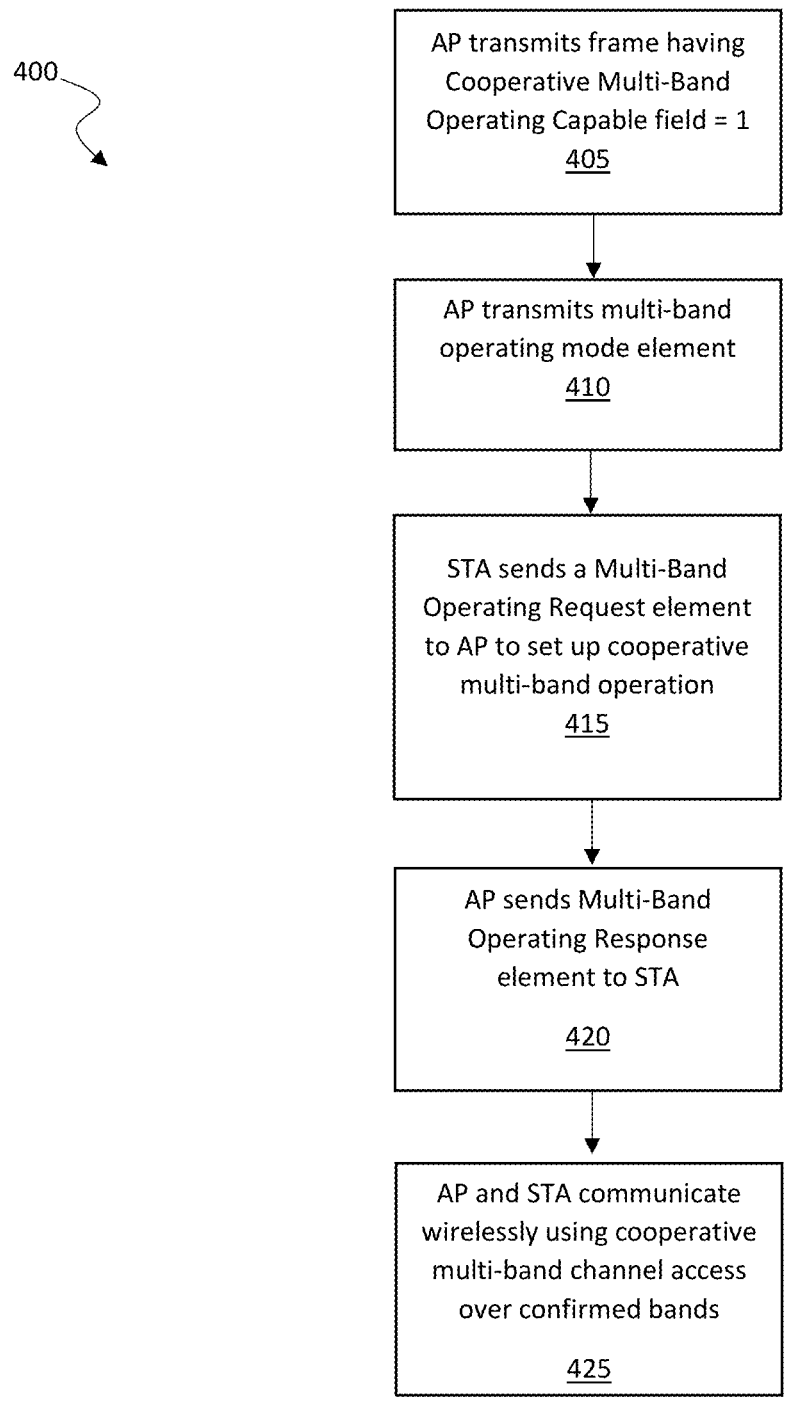
FIG. 4 is a flowchart depicting an exemplary sequence of computer implemented steps for establishing controllable multi-band channel access between an AP and one or more STAs according to embodiments of the present invention.

FIG. 4 is a flowchart of an exemplary sequence of computer implemented and/or computer controlled steps 400 for establishing controllable multi-band channel access between an AP and one or more STAs depicted according to embodiments of the present invention. By establishing multi-band channel access, the delay between the AP and the STA is mitigated and data throughput is improved.

At step 405, the AP transmits a frame that includes a Cooperative Multi-Band Operating Capable field having a value of 1 that is received by an STA. The Cooperative Multi-Band Operating Capable subfield can be included in an Extended Capabilities IE that is carried in a beacon, probe response, or association/re-association response frame.

At step 410, the AP transmits a multi-band operating mode element that is received by one or more STAs. The multi-band operating mode element consists of multi-band operating mode fields for a set of bands capable of cooperative multi-band operation. For each band, the multi-band operating mode element includes Band Information subfields indicating bands that support multi-band channel access and BSSID subfields that include a MAC address of the AP operating in the band indicated by the respective Band Information subfield. The value of the Band Information subfields can be encoded using well-known encoding techniques.

The multi-band operating mode element can also include a DL Multi-Band Control subfield, a UL Multi-Band Control subfield, a UL Multi-Band Access Type subfield, and a UL Multi-Band Access Category subfield for configuring and controlling the multi-band channel access. The AP can transmit a multi-band operating mode element for each band that supports multi-band operation.

The DL Multi-Band Control subfield is set to 1 when the AP has enabled cooperative multi-band channel access for a downlink frame transmission in the band indicated in the Band Information subfield 205 to enable DL Multi-Band Control. When the AP has not enabled cooperative multi-band channel access for a downlink frame transmission in the band indicated in the Band Information subfield 205 the value is set to 0.

The UL Multi-Band Control subfield is set to 1 when the AP has enabled cooperative multi-band channel access for an uplink frame transmission in the band indicated in the Band Information subfield. When the AP has not enabled cooperative multi-band channel access for an uplink frame transmission in the band indicated in the Band Information subfield, the value is set to 0.

The UL Multi-Band Access Type subfield is set to 1 when contention based cooperative multi-band channel access is enabled for an uplink frame transmission in the band indicated by the Band Information subfield. The UL Multi-Band Access Type subfield is set to 0 when contention based cooperative multi-band channel access is not enabled for an uplink frame transmission in the band indicated by the Band Information subfield. When the UL Multi-Band Control subfield is set to 0, the UL Multi-Band Access Type subfield is reserved. UL Multi-Band Access Category subfield indicates for which categories the STA can transmit an uplink frame using the cooperative multi-band channel access after receiving an EDCA TXOP.

At step 415, a STA that received the Multi-Band Operating Mode element from the AP sends a Multi-Band Operating Request element to the AP to set up cooperative multi-band operation. The Multi-Band Operating Request element includes Band Information subfields and STA MAC Address subfields for each requested band. The Band Information subfields indicate a requested band for setting up cooperative multi-band channel access. The requested bands are selected from the bands included in the Band Information Subfield of the Multi-Band Operating Mode element. The Band Information subfield can be encoded using well-known encoding techniques. The STA Mac Address subfields include the MAC address of the STA operating in the band indicated by the respective Band Information Subfield.

At step 420, after receiving the Multi-Band Operating Request element from an STA, the AP sends a Multi-Band Operating Response element to confirm the cooperative multi-band operation setup with the STA. The Multi-Band Operating Response element includes a Band Information subfield that indicates a list of confirmed bands for cooperative multi-band channel access. The Band Information subfield can be encoded using well-known encoding techniques. The list of confirmed bands is a subset of the requested bands sent from the STA in the Multi-Band Operating Request element. The Multi-Band Operating Response element optionally includes a Multi-Band Operating Mode subfield that indicates the multi-band operating mode used by each confirmed band.

At step 425, the AP and the STA communicate wirelessly using cooperative multi-band channel access over the confirmed bands (e.g., 2.4 GHz and 5 GHz).

Figure 5A:
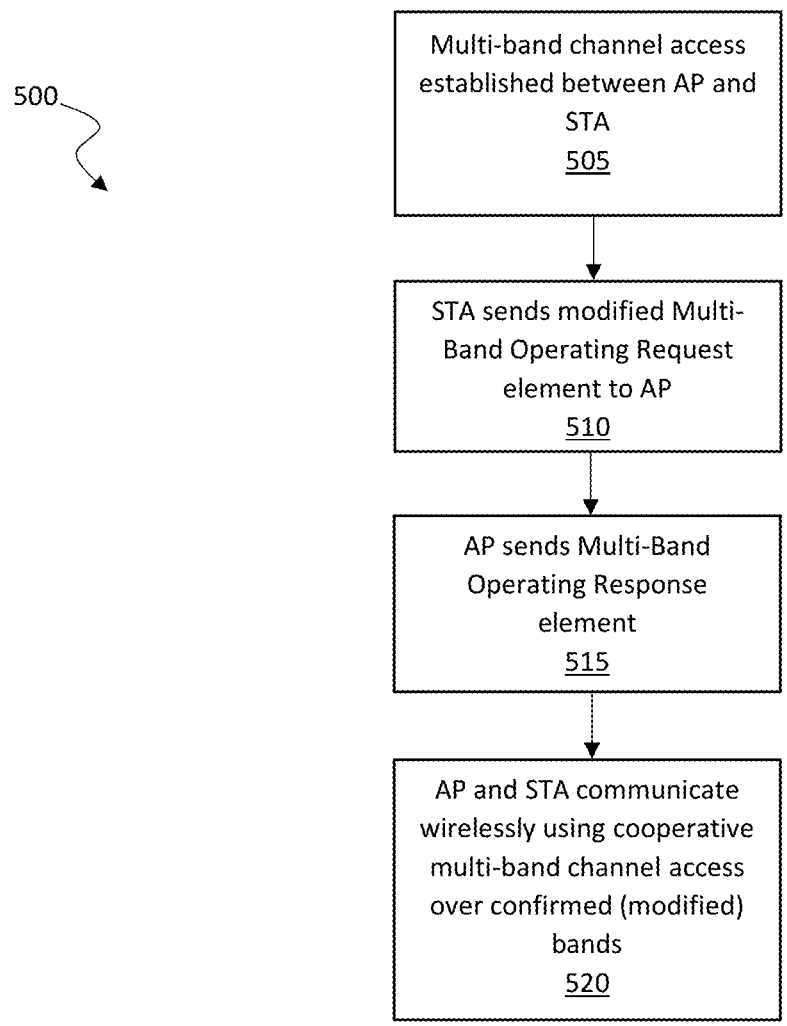
FIG. 5A is a flowchart depicting an exemplary sequence of computer-implemented steps for modifying the operating parameters of an established cooperative multi-band channel access operation as initiated by an STA according to embodiments of the present invention.

With regard to FIG. 5A, a flow chart of an exemplary sequence of computer-implemented steps 500 for modifying the operating parameters of an established cooperative multi-band channel access operation is depicted according to embodiments of the present invention.

At step 505, multi-band channel access between an AP and an STA is established e.g., using steps 400 depicted in FIG. 4.

At step 510, the STA sends a modified Multi-Band Operating Request element to the AP. For example, the Modified Multi-Band Operating Request element can include a modified Band Information subfield for establishing cooperative multi-band channel access using a different band or bands.

At step 515, after receiving the modified Multi-Band Operating Request element, the AP sends a Multi-Band Operating Response element e.g., as described at step 420 of FIG. 4.

At step 520, the AP and the STA communicate wirelessly using cooperative multi-band channel access over the confirmed (modified) bands.

Figure 5B:
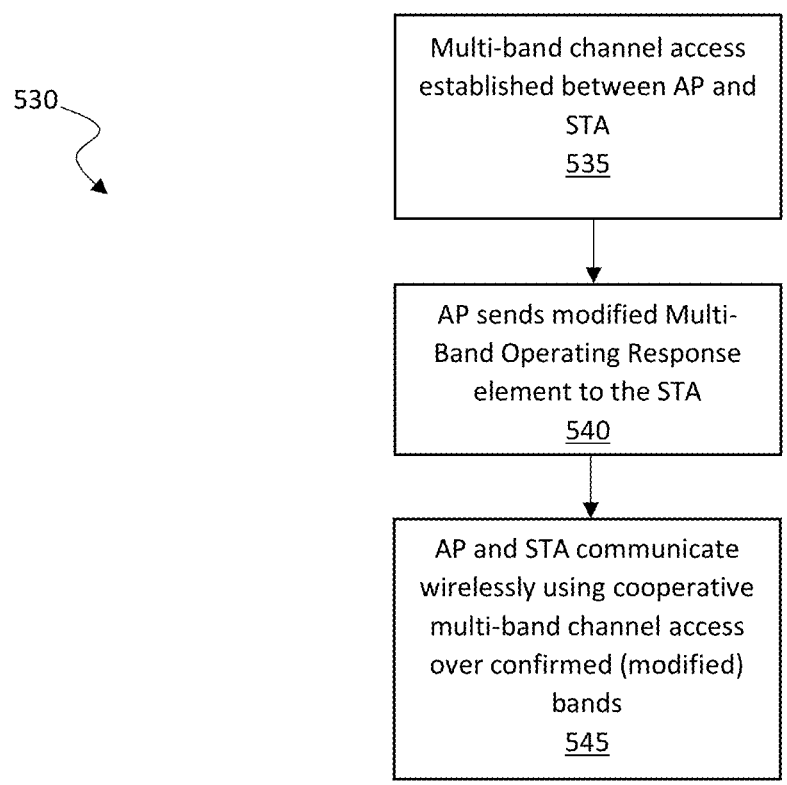
FIG. 5B is a flowchart depicting an exemplary sequence of computer-implemented steps for modifying the operating parameters of an established cooperative multi-band channel access operation as initiated by an AP according to embodiments of the present invention.

With regard to FIG. 5B, a flow chart of an exemplary sequence of computer-implemented steps 530 for modifying the operating parameters of an established cooperative multi-band channel access operation is depicted according to embodiments of the present invention.

At step 535, multi-band channel access between an AP and an STA is established e.g., using steps 400 depicted in FIG. 4.

At step 540, the AP sends a modified Multi-Band Operating Response element to the AP STA. For example, the modified Multi-Band Operating Response element can include a modified Band Information subfield for establishing cooperative multi-band channel access using a modified set of bands.

At step 545, the AP and the STA communicate wirelessly using cooperative multi-band channel access over the confirmed (modified) bands.

Figure 5C:
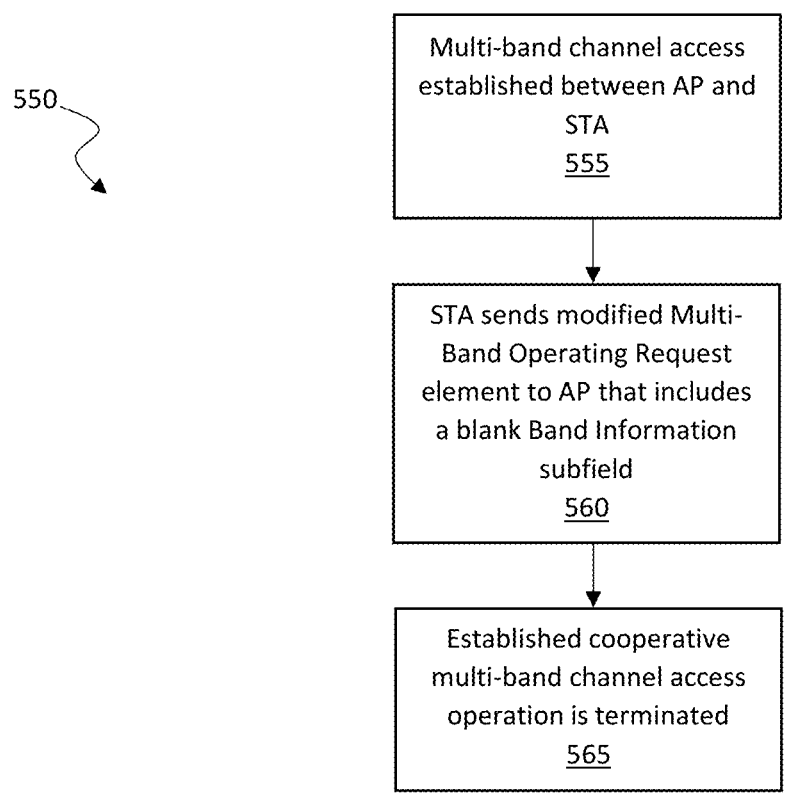
FIG. 5C is a flowchart depicting an exemplary sequence of computer-implemented steps for terminating an established cooperative multi-band channel access operation as initiated by an STA according to embodiments of the present invention.

With regard to FIG. 5C, a flow chart of an exemplary sequence of computer-implemented steps 550 for terminating an established cooperative multi-band channel access operation is depicted according to embodiments of the present invention.

At step 555, multi-band channel access between an AP and an STA is setup e.g., using steps 400 depicted in FIG. 4.

At step 560, the STA sends a modified Multi-Band Operating Request element to the AP that includes a blank Band Information subfield.

At step 565, responsive to the modified Multi-Band Operating Request element, the established cooperative multi-band channel access operation is terminated.

Figure 5D:
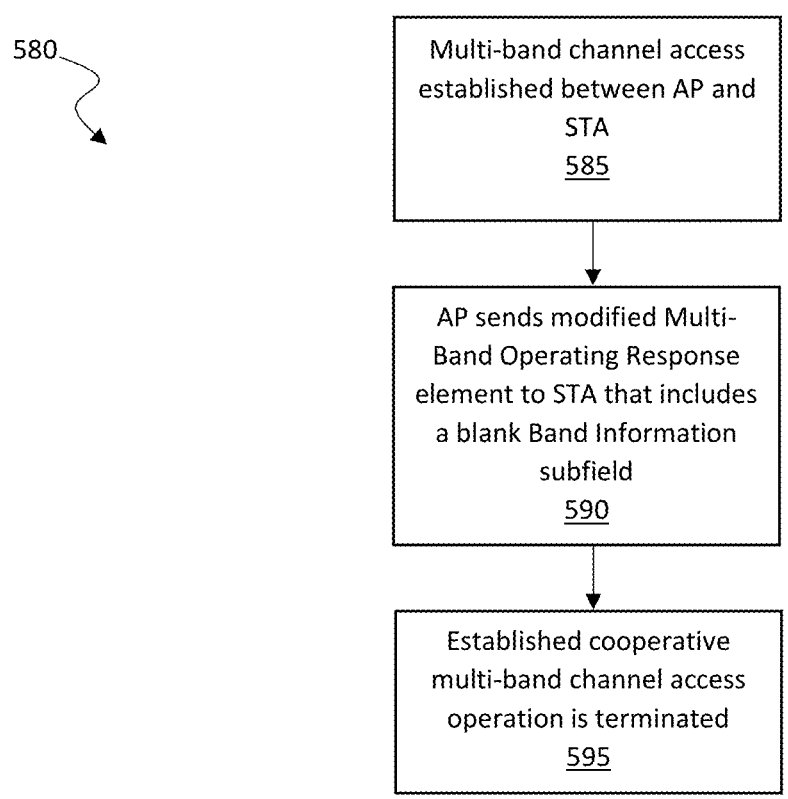
FIG. 5D is a flowchart depicting an exemplary sequence of computer-implemented steps for terminating an established cooperative multi-band channel access operation as initiated by an AP according to embodiments of the present invention.

With regard to FIG. 5D, a flow chart of an exemplary sequence of computer-implemented steps 580 for terminating an established cooperative multi-band channel access operation is depicted according to embodiments of the present invention.

At step 585, multi-band channel access between an AP and an STA is established e.g., using steps 400 depicted in FIG. 4.

At step 590, the AP sends a modified Multi-Band Operating Response element to the STA that includes a blank Band Information subfield.

At step 595, responsive to the modified Multi-Band Operating Response element, the established cooperative multi-band channel access operation is terminated.

Figure 5E:
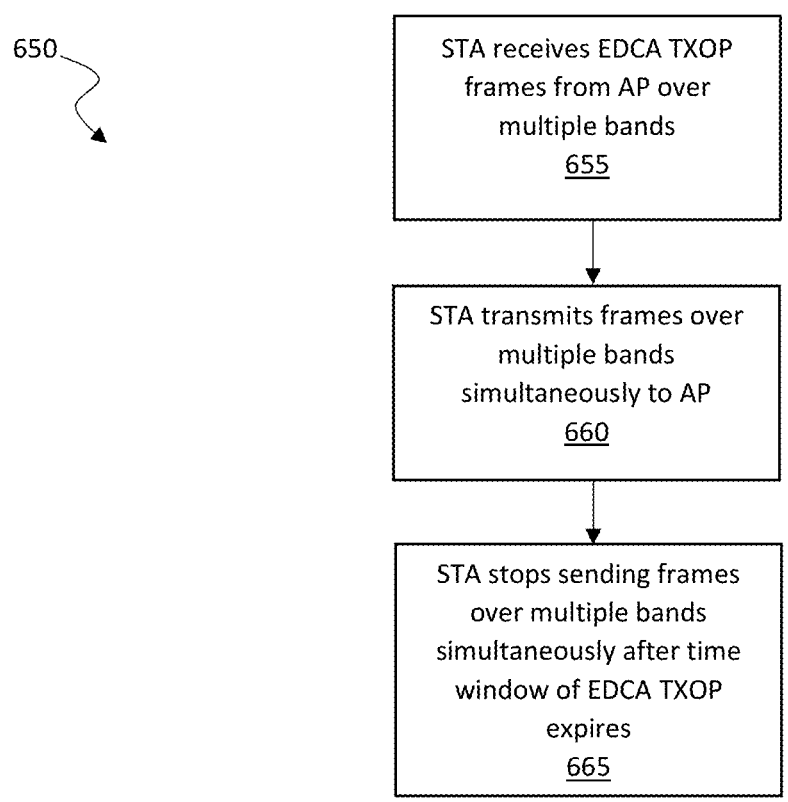
FIG. 5E is a flowchart depicting an exemplary sequence of computer-implemented steps for performing cooperative multi-band channel access during a TXOP window according to embodiments of the present invention.

With regard to FIG. 5E, a flow chart of an exemplary sequence of computer-implemented steps 650 for transmitting frames over multiple bands simultaneously from an STA to AP based on a time window defined in an EDCA TXOP frame is depicted according to embodiments of the present invention.

At step 655, the STA receives EDCA TXOP frames from an AP over multiple bands.

At step 660, the STA transmits frames over multiple bands simultaneously to the AP.

At step 665, the STA stops sending frames over multiple bands simultaneously after time window of EDCA TXOP expires.

According to embodiments of the present invention, an AP can use multi-band channel access for downlink frames, and an STA in communication with the AP can enable the reception of data using multi-band channel access. Alternatively, the AP can use multi-band channel access to transmit uplink frames using trigger frames, e.g., control frames, to provide Triggered Uplink Access. In this case, the STA is unable to send frames through EDCA multi-band channel access.

Exemplary Computer Controlled System

Embodiments of the present invention are drawn to electronic systems for performing cooperative multi-band operations. The following discussion describes one such exemplary electronic system or computer system can be used as a platform for implementing embodiments of the present invention.

Figure 6:
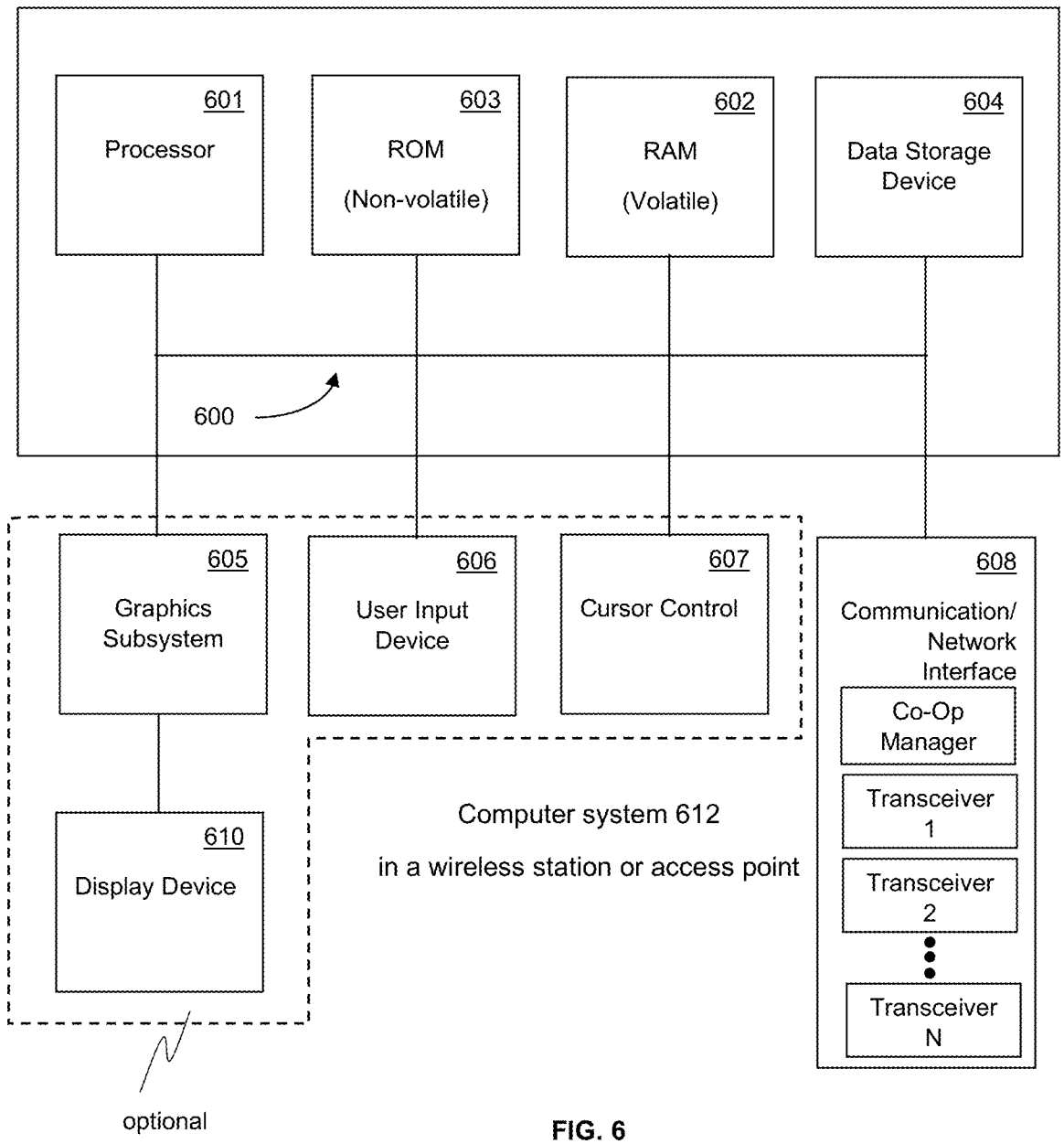
FIG. 6 is a block diagram of an exemplary computer system upon which embodiments of the present invention may be implemented.

In the example of FIG. 6, the exemplary computer system 612 (e.g., a multi-band cooperative wireless access point or a multi-band cooperative wireless station) includes a central processing unit (CPU) 601 for running software applications and optionally an operating system. Random access memory 602 and read-only memory 603 store applications and data for use by the CPU 601. Data storage device 604 provides non-volatile storage for applications and data and may include fixed disk drives, removable disk drives, flash memory devices, and CD-ROM, DVD-ROM or other optical storage devices. The optional user inputs 606 and 607 comprise devices that communicate inputs from one or more users to the computer system 612 (e.g., mice, joysticks, cameras, touch screens, and/or microphones).

A communication or network interface 608 includes a plurality of transceivers and allows the computer system 612 to communicate with other computer systems, networks, or devices via an electronic communications network, including wired and/or wireless communication and including an Intranet or the Internet (e.g., 802.11 wireless standard). The communication or network interface 608 can operate multiple transceivers simultaneously e.g., Transceiver 1 and Transceiver 2. The communication or network interface 608 can further include a cooperative management unit for coordinating the data sent and/or received by the transceivers. The communication or network interface 608 and can include a dual band interface that can operate in multiple bands simultaneously, such as 2.4 GHz and 5 GHz.

The optional display device 610 may be any device capable of displaying visual information in response to a signal from the computer system 612 and may include a flat panel touch sensitive display, for example. The components of the computer system 612, including the CPU 601, memory 602/603, data storage 604, user input devices 606, and graphics subsystem 605 may be coupled via one or more data buses 600.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of establishing cooperative multi-band operation between a wireless station (STA) and a wireless access point (AP), the method comprising:
    a) transmitting a first frame from the AP to the STA, wherein the first frame comprises a subfield indicating that the AP supports cooperative multi-band operation;
    b) transmitting a second frame from the AP to the STA, wherein the second frame comprises band information of a first band and a second band, the first band and the second band supporting cooperative multi-band operation;
    c) receiving a third frame at the AP from the STA, wherein the third frame comprises a request to establish cooperative multi-band operation using the first band and the second band;
    d) transmitting a fourth frame from the AP to the STA, wherein the fourth frame comprises a confirmation to establish cooperative multi-band operation using the first band and the second band; and
    e) using cooperative multi-band channel access to send and receive data between the STA and the AP according to the band information.

2. The method described in claim 1, further comprising sending and receiving data between the STA and the AP using the cooperative multi-band operation over the first band and the second band.

3. The method described in claim 2, wherein the first band comprises a 2.4 GHz wireless band and the second band comprises a 5 GHz wireless band.

4. The method described in claim 3, wherein the STA and AP both comprise a respective 2.4 GHz wireless transceiver for operating over the first band and a 5 GHz wireless transceiver for operating over the second band.

5. The method described in claim 4, wherein the 2.4 GHz wireless transceivers and the 5 GHz wireless transceivers are operable to communicate simultaneously.

6. The method described in claim 1, wherein the third frame comprises a MAC address of the STA.

7. The method described in claim 1, wherein the fourth frame comprises an operating mode for configuring the cooperative multi-band operation.

8. The method described in claim 1, further comprising receiving a fifth frame at the AP from the STA, wherein the fifth frame comprises band information identifying a modified band, and wherein the modified band replaces the first band for performing the cooperative multi-band operation.

9. The method described in claim 1, further comprising receiving a fifth frame at the STA from the AP, wherein the fifth frame comprises band information identifying a modified band, and wherein the modified band replaces the first band for performing the cooperative multi-band operation.

10. The method described in claim 1, further comprising:
    receiving a fifth frame at the AP from the STA, wherein the fifth frame comprises a blank band information field; and
    terminating the cooperative multi-band operation responsive to receiving the fifth frame.

11. The method described in claim 1, further comprising:
    sending a fifth frame from the AP to the STA, wherein the fifth frame comprises a blank band information field; and
    terminating the cooperative multi-band operation responsive to receiving the fifth frame.

12. A system for cooperative multi-band operation for communication with a wireless station (STA), the system comprising:
    a wireless access point (AP), wherein:
        the AP is operable to transmit a first frame to the STA, wherein the first frame comprises a subfield indicating that the AP supports cooperative multi-band operation,
        the AP is operable to transmit a second frame to the STA, wherein the second frame comprises band information of a first band and a second band, the first band and the second band supporting cooperative multi-band operation;
        the AP is operable to receive a third frame from the STA, wherein the third frame comprises a request to establish cooperative multi-band operation using the first band and the second band;
        the AP is operable to transmit a fourth frame to the STA, wherein the fourth frame comprises a confirmation to establish cooperative multi-band operation using the first band and the second band; and
        the AP is operable to send and receive data with the STA according to the band information using cooperative multi-band channel access.

13. The system described in claim 12, wherein the STA and the AP communicate using the cooperative multi-band operation over the first band and the second band.

14. The system described in claim 12, wherein the first band comprises a 2.4 GHz wireless band and the second band comprises a 5 GHz wireless band.

15. The system described in claim 14, wherein the STA and AP both comprise a respective 2.4 GHz wireless transceiver for operating over the first band and a 5 GHz wireless transceiver for operating over the second band.

16. The system described in claim 15, wherein the 2.4 GHz wireless transceivers and the 5 GHz wireless transceivers are operable to communicate simultaneously.

17. The system described in claim 12, wherein the third frame comprises a MAC address of the STA.

18. The system described in claim 12, wherein the fourth frame comprises an operating mode for configuring the cooperative multi-band operation.

19. A dual-band device for performing cooperative multi-band operation with a wireless station (STA), the device comprising:

a first transceiver configured to communicate over a first wireless band;

a second transceiver configured to communicate over a second wireless band, wherein the first transceiver and the second transceiver are operable to communicate simultaneously; and a cooperative management unit configured to exchange data with the first transceiver and the second transceiver for managing cooperative multi-band channel access of the first transceiver and the second transceiver, wherein the cooperative management unit is operable to:

cause to be transmitted a first frame to the STA, wherein the first frame comprises a subfield indicating that the device supports cooperative multi-band operation;

cause to be transmitted a second frame to the STA, wherein the second frame comprises band information of a first band and a second band, the first band and the second band supporting cooperative multi-band operation;

cause to be received a third frame from the STA, wherein the third frame comprises a request to establish cooperative multi-band operation using the first band and the second band;

cause to be transmitted a fourth frame to the STA, wherein the fourth frame comprises a confirmation to establish cooperative multi-band operation using the first band and the second band; and cause to be sent and received data with the STA according to the band information using cooperative multi-band channel access.

20. The device described in claim 19, wherein the device and the STA communicate using the cooperative multi-band operation over the first band and the second band.

\* \* \* \* \*